US008244414B2

(12) United States Patent
Fok et al.

(10) Patent No.: US 8,244,414 B2
(45) Date of Patent: Aug. 14, 2012

(54) AVIONIC AVIATION SYSTEM WITH AN EARTH STATION FOR AUTOMATICALLY ELIMINATING OPERATING MALFUNCTIONS OCCURRING IN AIRPLANES, AND CORRESPONDING METHOD

(75) Inventors: Marcel Fok, Zurich (CH); Shinji Shirai, Elsau (CH)

(73) Assignee: Swiss Reinsurance Company Ltd., Zürich (CH)

( * ) Notice: Subject to any disclaimer, the term of this patent is extended or adjusted under 35 U.S.C. 154(b) by 475 days.

(21) Appl. No.: 12/524,389

(22) PCT Filed: Jan. 24, 2008

(86) PCT No.: PCT/EP2008/000553
§ 371 (c)(1),
(2), (4) Date: Jul. 24, 2009

(87) PCT Pub. No.: WO2008/089988
PCT Pub. Date: Jul. 31, 2008

(65) Prior Publication Data

US 2010/0036545 A1 Feb. 11, 2010

(30) Foreign Application Priority Data

Jan. 24, 2007 (EP) ........................ PCT/EP07/50708

(51) Int. Cl.
*G01C 23/00* (2006.01)

(52) U.S. Cl. .......................................... 701/3; 701/31.5

(58) Field of Classification Search .................. 701/2, 3, 701/14, 15, 16, 29.3, 27.7, 31.3, 31.5
See application file for complete search history.

(56) References Cited

U.S. PATENT DOCUMENTS

| | | | | |
|---|---|---|---|---|
| 5,890,079 | A | 3/1999 | Levine | |
| 5,974,349 | A | 10/1999 | Levine | |
| 2007/0027589 | A1 * | 2/2007 | Brinkley et al. | 701/3 |
| 2008/0154444 | A1 * | 6/2008 | Miller et al. | 701/3 |

FOREIGN PATENT DOCUMENTS

| | | |
|---|---|---|
| DE | 198 56 231 | 6/2000 |
| JP | 2004 352071 | 12/2004 |
| WO | 01 30632 | 5/2001 |

OTHER PUBLICATIONS

Clinton, John T. "The Revolution of the Aircraft Engine Ground Maintenance Station", Aerospace Conference 2001, IEEE Proceedings, vol. 6, pp. 6-2927 to 6-2935, (Mar. 20,2001).

* cited by examiner

*Primary Examiner* — Mark Hellner
(74) *Attorney, Agent, or Firm* — Oblon, Spivak, McClelland, Maier & Neustadt, L.L.P.

(57) ABSTRACT

An avionic aviation system, and a corresponding method, with an earth station for automatically eliminating operating malfunctions occurring in airplanes. The avionic aviation system is connected to a plurality of airplanes via a wireless interface of the avionics. If, by sensor, an operating malfunction is detected on an airplane, a dedicated operating malfunction usage device is selected to automatically eliminate the malfunction by a filter module, and a switching device of the earth station is specifically enabled to activate the operating malfunction usage device.

24 Claims, 2 Drawing Sheets

Figure 1:
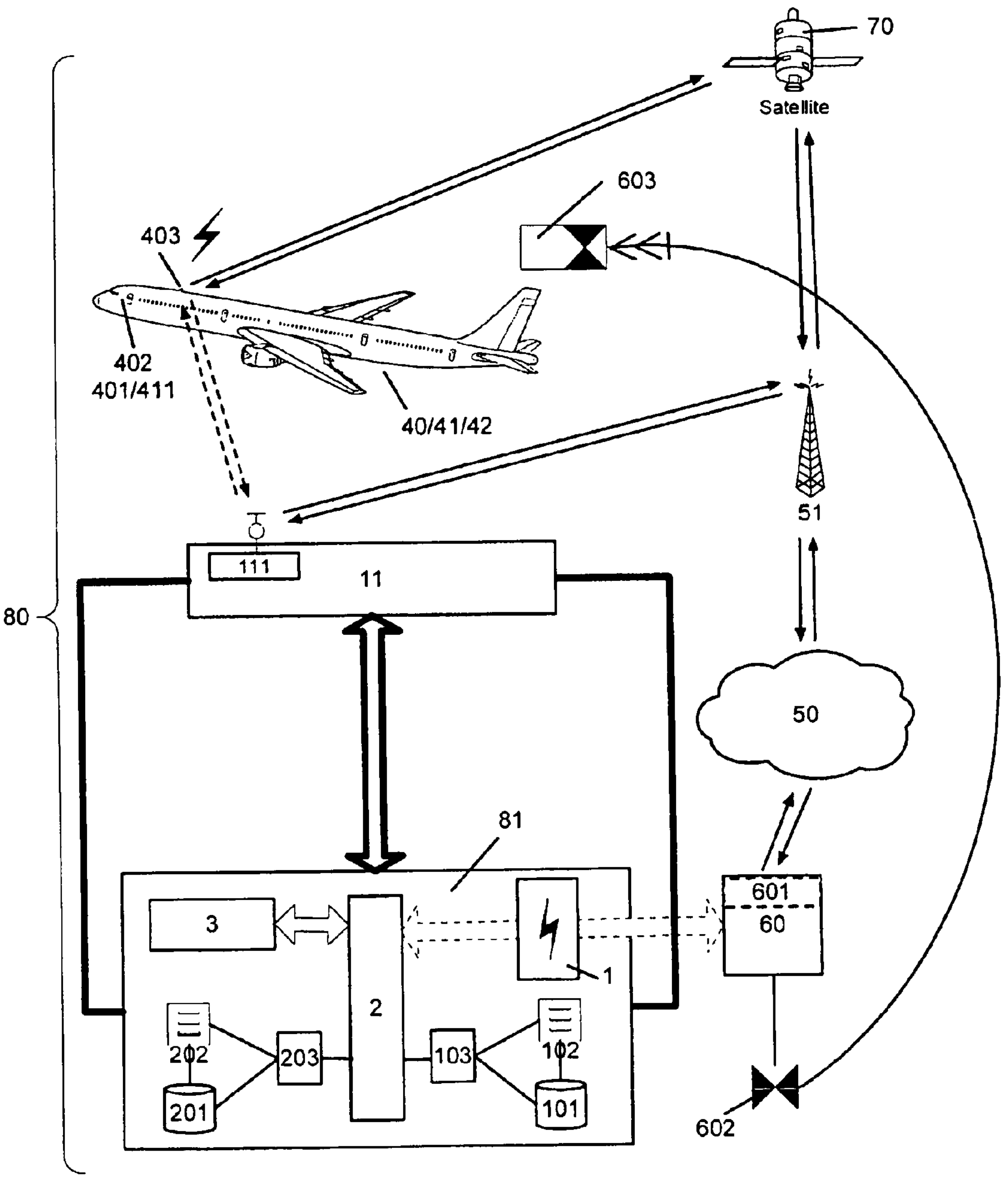

AVIONIC AVIATION SYSTEM WITH AN EARTH STATION FOR AUTOMATICALLY ELIMINATING OPERATING MALFUNCTIONS OCCURRING IN AIRPLANES, AND CORRESPONDING METHOD

The invention concerns an avionic aviation system with an earth station for automatically eliminating operating malfunctions occurring in aircraft. The avionic aviation system is connected to multiple aircraft via a wireless interface of avionics. By means of a switching device of the earth station of the aviation system, dedicated operating malfunction intervention devices for automatic elimination of operating malfunctions are activated, if an operating malfunction occurs on an aircraft and is detected by means of sensors.

PRIOR ART

In the last twenty years, the quantity of goods and people transported by aircraft has exploded throughout the world. Industry and commerce depend on air transport in many ways. However, as with any technical device, operating malfunctions occur again and again even in aircraft. The causes of them are various, and range from material wear, material fatigue, inadequate maintenance of the aircraft or land bases, wrong behaviour by pilots, to wrong or insufficient weather assessments. But even with careful training of the pilots, excellent maintenance of the aircraft and careful flight preparation, operating malfunctions cannot be excluded, which is intrinsic in the complexity of the participating systems. It is not always easy to clarify the causes and backgrounds of air accidents and operating malfunctions. Additionally, the rapidly rising amount of air transport in the last few years requires automation at all levels. However, until now automation without human intervention was not possible in the prior art, in elimination of operating malfunctions in particular. Despite the large number of people and goods transported by aircraft, interruptions of operation in the case of aircraft are not subject to the regularities of large numbers. On the one hand, the technical complexity in the construction of aircraft, mostly with multiple engines and several thousand interacting sensors and operating units, in extreme cases results in behaviour which is unpredictable for the person skilled in the art. On the other hand, the physics and dynamics of the wings and fuselage, for instance, are by no means so well understood technically that the designed aircraft show behaviour which is predictable in all cases in flight. On the contrary, most of the design engineering of the wings and aircraft body is still based on empirical experience values, and not shapes which are technically predicted. The behaviour of aircraft themselves in operation also depends greatly on the weather. Actually at present the weather itself is neither really predictable nor calculable for relatively long periods technically, but is subject to chaotic, highly non-linear processes, which cannot be extrapolated to arbitrarily long periods. Thus efficient, stable automation of the elimination of operating malfunctions escapes the avionic aviation systems which are known in the prior art. As mentioned, the large increase of air transport in the last few years has created a need for new aviation systems, which can eliminate operating malfunctions efficiently and compensate for them effectively. On the one hand, operating malfunctions should be prevented in advance, and on the other hand their occurrence should be detected and eliminated promptly, if possible before a disaster occurs. Efficient elimination of operating malfunctions by means of an aviation system obviously also helps to minimise the commercial consequences for the operator, which creates advantages, in particular in competition with other operators. In the elimination of operating malfunctions, not only the type of intervention devices for malfunction elimination (e.g. operating malfunction intervention devices such as automatic extinguishing systems, closure systems and regulators, alarm and signalling equipment, switching and actuation equipment or disaster intervention devices etc.) have a role, but also how measured monitoring parameters are filtered, processed and technically implemented to control the resources. In particular in the case of real time capture, analysis and management of the measured parameters of such systems, it is often the technical implementation which provides problems which are almost insuperable. The enormous quantity of data, which are available at all times from a wide variety of capture and detection equipment (e.g. wind speed sensors, satellite images, water level sensors, water and wind temperature sensors etc.) makes monitoring and control by purely human action and perception possible only with difficulty. The technical implementation of such aviation systems should therefore, if possible, be fully automated, and interact in real time with both the capture equipment and the operating malfunction intervention devices. In many cases involving signal quantity and/or reaction speed, even interactions which are only partly human are no longer possible in aeronautical engineering. In the case of complex systems, human interaction also has the disadvantage that its liability to errors increases non-linearly depending on the complexity. The behaviour and/or operation of the system becomes unpredictable. Unexpected interruptions of operation or system crashes are the result. There are numerous recent examples of this, e.g. system-generated interruptions of operation in systems which are coupled with human interaction. For instance, despite all emergency intervention devices and systems, there are unpredictable aircraft crashes such as the MD11 crash of Swissair before Halifax on 3 Nov. 1998 or the air accident at Überlingen in July 2002, etc.

Although operating malfunctions in the case of aircraft, for both passenger transport and goods transport, have also become more frequent because of the increasing quantity which is transported, for aircraft operating malfunctions it is still true that the prior art has many fewer experience values available to it than for operating malfunctions in other technical fields. This concerns, for instance, the number of existing, operational units with comparable historical events. It follows that to implement an aviation system to eliminate operating malfunctions, statistical experience values such as the "law of large numbers" are essentially inapplicable. Additionally, for aircraft it is difficult in many cases of operating malfunction to establish the real cause, despite expensive technical aids such as the black box and continuous monitoring of the flight trajectory. This makes it difficult to base automated intervention devices for eliminating operating malfunctions, or equivalent electronic switching and signal generation systems, on the necessary causality, or to obtain appropriate data at all. In the prior art, an attempt is made, for instance, to base appropriate data on the land bases concerned, the types of aircraft used or the number of operated aircraft (e.g. using market shares of the operator, e.g. turnover, etc.). Known such systems are, for instance, RPK (Revenue Passenger Kilometer), AVF (Average Fleet Value) etc. In this way the operator's behaviour can be taken into account, for instance. One of the disadvantages of these systems is that the turnover reflects only the momentary and immediately following future, and technically allows a breakdown of the causes of operating malfunctions only very indirectly. Also technically, only in very rare cases is there direct dependency between turnover and the operating malfunctions which occur. Some systems of the prior art are also based on the number of aircraft in operation, which is taken as a parameter for the type and technical possibilities for implementing an automated aviation system for eliminating operating malfunctions. These systems reflect the occurrence of operating malfunctions better in some circumstances. However, all aircraft operators do not necessarily use the same technical equipment, technical know-how, maintenance of the machines, flight bases, etc., to say nothing of using them equally for all operated aircraft. This absorbs the dependency greatly, so that implementation of such systems itself acquires uncertainties and requires a large tolerance for errors. Other aviation systems of the prior art are based in their technical implementation on the so-called burning rate method. One of the problems of the burning rate method is based on the difficulty of extrapolating operating malfunctions and their expected values onto future operating malfunctions. Among other things, this is because of the complexity and non-linearity of the external influences on aircraft operation.

For the aviation systems of the prior art, for differentiated signal generation, human interaction is still a necessary precondition in many fields. Particularly in the case of operating malfunctions, the complexity of the participating devices, captured measured parameters or processes and interactions with the environment to be monitored is exceeded to an extent which allows human interaction less and less. In particular for controlling and monitoring the dynamic and/or non-linear processes which result in the operating malfunctions, automation of detection escapes the prior art. It is often the non-linearity in particular which removes the basis for automation from conventional equipment. Many technical implementations of a wide variety of early warning equipment and image and/or pattern recognition equipment, in particular in the case of analogue measured data or necessary self-organisation of the device, are still not satisfactorily achieved in the prior art. Most natural processes have a non-linear course at least in part, and outside a narrow linear equilibrium range tend to exponential behaviour. Efficient, reliably functioning early warning signal generation and automated elimination of operating malfunctions can therefore be important to the survival of aircraft. Efficient elimination of operating malfunctions includes complex technical partial devices of the aircraft and the many thousand sensors and measurement signals, or monitoring and control systems based on environmental effects which are difficult to monitor, such as meteorological effects (storms, hurricanes, floods, thermals). Automation of the elimination of malfunctions should be able to take account of all these effects without affecting the reaction speed of the malfunction elimination. Such systems have not been known in the prior art until now. International patent specification WO 2004/045106 (EP 1563616) shows a prior art system with which operating data of an aircraft can be collected and transmitted to an earth station via communication means of the on-board system. European patent specification EP 1 455 313 shows another prior art system, with which flight and operating parameters can be monitored using a so-called Aircraft Condition Analysis and Management System (ACAMS), and operating malfunctions which occur or are to be expected can be detected. European patent specification EP 1 630 763 A1 shows another monitoring and control system. With this system, operating malfunctions which occur can be avoided on the basis of the transmitted measured parameters. The alarm device which is shown with it is based, in particular, on forecast trajectories, which are generated by the system, of the monitored aircraft. If operating malfunctions exist, a corresponding alarm signal is automatically generated. US patent specification U.S. Pat. No. 6,940,426 shows a system for determining the probability of operating malfunctions which occur in aircraft. Various measured parameters of both historical events and dynamically captured events are captured, and taken into account appropriately in the signal generation. European patent specification EP 1 777 674 shows a monitoring and control system for landings and takeoffs of aircraft. The measured parameters can be captured, managed and used for monitoring signal generation by multiple assigned aircraft simultaneously. European patent specification EP 1 840 755 A2 shows a further aviation system for avoiding and eliminating operating malfunctions. Multiple measured parameters of the aircraft are transmitted to an earth station. This compares the measured data, e.g. with manufacturer's data, in real time, and if they are different generates an appropriate control signal and/or control software for the avionics of the aircraft or for the operator. U.S. Pat. No. 5,500,797 shows a monitoring system which detects operating malfunctions in the aircraft and stores measured parameters. The stored measured parameters can be used in the analysis of the operating malfunction. In particular, measured data are stored for future operating malfunctions, and can be used to control operating malfunction intervention devices. Finally, European patent specification EP 1 527 432 B1 shows an avionic aviation system for location-bound flight monitoring of aircraft. On the basis of the transmitted data, for instance an appropriate alarm signal can be automatically generated, and monitoring and control functions can be generated.

TECHNICAL OBJECT

It is an object of this invention to propose an avionic aviation system with an earth station for automatically eliminating operating malfunctions occurring in aircraft, without the above-mentioned disadvantages. In particular, the solution should make it possible to make available a fully automated electronic aviation system which reacts and/or adapts itself dynamically to changed conditions and interruptions of operation. It should also be a solution which makes it possible to design the avionic aviation systems in such a way that changeable causality and dependency of the operating malfunctions (e.g. place of intervention, type of intervention, operation of the aircraft, external influences such as weather, land base, etc.) are taken into account by the aviation system with the necessary precision, and integrated in such a way in the technical implementation that human interaction is unnecessary.

According to this invention, this aim is achieved, in particular, by the elements of the independent claims. Other advantageous embodiments also result from the dependent claims, the description and the drawings.

In particular, these aims are achieved by the invention in that the avionic aviation system with an earth station for automatically eliminating operating malfunctions occurring in aircraft is connected to multiple aircraft via a wireless interface of the avionics of the aircraft, dedicated operating malfunction intervention devices for automatic elimination of operating malfunctions being activated by means of a switching device of the earth station if an operating malfunction occurs and is detected by sensors, that the aviation system includes detection devices which are integrated into the avionics of the aircraft for electronic capture of executed takeoff and/or landing units of the aircraft, log parameters, which are assigned to an aircraft, of the executed takeoff and/or landing units being transmitted by the detection devices via the wireless interface to the earth station, that the earth station contains, for every aircraft, an incrementable Techlog stack memory with a readable stack memory level value, the Techlog stack memory level value being raised by means of a counter module on the basis of filtered takeoff and/or landing units of the transmitted log parameters of the relevant aircraft after transmission of the parameters, that the counter module contains means of reading the Techlog stack memory level value, and the earth station contains a filter module, by means of which filter module, for a specified time window, a memory threshold value to enable the activation of the operating malfunction intervention device is determined dynamically on the basis of the Techlog stack memory level value, that the earth station contains an activation stack memory of a protected memory module to capture activation parameters of the aircraft, the activation parameters being transmitted to the earth station on the basis of the current memory threshold value, and the activation stack memory being incremented in steps corresponding to the transmitted activation parameters, and that by means of a counter module of the earth station an activation stack memory level value of the activation stack memory is cumulatively captured, and if the dynamically determined memory threshold value is reached with the activation stack memory level value, by means of the filter module the switching device is released for dedicated activation of operating malfunction intervention means if operating malfunctions occur. The assigned log parameters can, for instance, be transmitted directly to the earth station via a satellite-based network by means of the wireless interface of the avionics of the aircraft. However, the assigned log parameters can also, for instance, be transmitted to the earth station by means of the wireless interface of the avionics (on-board system) of the aircraft, via a wireless communication network of a land base which is being approached. The detection devices can, for instance, be fully integrated into the avionics of the aircraft. However, the land bases can, for instance, also include at least parts of the detection device. The detection device can, for instance, be at least partly implemented as part of a monitoring system of a land base, e.g. an airport or airfield. The detection device can, for instance, also be partly implemented as part of a monitoring system of a flight service provider and/or flight operation provider. This has the advantage that for the avionics of the aircraft, no further technical adaptations or implementations other than what already exists are necessary. For instance, the detection device can be implemented at every possible flight or land base, or the cycles can be captured elsewhere and transmitted to the aviation system. The invention has the advantage, among others, that by means of the device according to the invention, a unitary fully automated avionic aviation system, which is to be integrated technically into the existing electronics of the aircraft (avionics), with an earth station for automatically eliminating operating malfunctions occurring in aircraft, can be implemented. This was not possible in the prior art until now, since automation without human interaction often had unforeseeable instabilities. Despite the large number of people and goods transported by aircraft, interruptions of operation in the case of aircraft are not subject to the regularities of large numbers. On the one hand, the technical complexity in the construction of aircraft, mostly with multiple engines and several thousand interacting sensors, in extreme cases results in behaviour which is unpredictable for the person skilled in the art. On the other hand, the physics of the wing dynamics, for instance, is by no means so well understood technically that aircraft show behaviour which is predictable in all cases in flight. On the contrary, most of the design engineering of the wings and aircraft body is still based on empirically collected experience values, and not shapes which are technically predicted or calculated. Aircraft themselves in operation also depend greatly on the weather. At present the weather itself is neither really predictable nor calculable technically, but is subject to chaotic, highly non-linear processes. Thus efficient, stable automation of the elimination of operating malfunctions escaped the avionic aviation systems which are known in the prior art. The aviation system according to the invention, with earth station, now eliminates this deficiency of the prior art, and for the first time makes it possible to implement an appropriate, automated avionic aviation system. A further advantage is that by means of the aviation system according to the invention, at least partly on the basis of cycles (takeoff and landing), the causality and dependency of the operating malfunctions can be captured with the necessary precision and used. Thus dynamically adapted operational safeguarding can be guaranteed by means of automated elimination of operating malfunctions. In the special case of embodiments with additional parameters based on money values, the aviation system, for the first time, allows full automation of the additional tariff setting of the operating malfunction at all stages. This too was impossible in the prior art until now. As mentioned, the activation parameters are variably determined by means of the filter module, on the basis of the detected number of takeoff and/or landing units. Similarly, it can be useful to detect the takeoff and/or landing units dynamically or partly dynamically, e.g. by means of measuring sensors of the detection device. The earth station is thus signalled dynamically about the takeoffs and landings which an aircraft has done. As an variant embodiment, for instance land-base-specific data of the assigned landing/takeoff base for aircraft, e.g. goods flight transport means and/or passenger flight transport means, can also be detected dynamically by means of sensors and/or detection means of the detection device. The aircraft which are assigned to the aviation system have detection devices with an interface to the earth station and/or land base and/or satellite-based network. The interface to the earth station can be implemented using an air interface, for instance. This variant embodiment has the advantage, among others, that the aviation system allows real time capture of the cycles (takeoff/landing). Another result is the possibility of dynamic adaptation of operation of the aviation system in real time to the current situation, and/or in particular corresponding real time adaptation of the activation parameters. The technical implementation of the method thus obtains the possibility of self-adaptation of the aviation system. This also allows full automation. This kind of automation is impossible with any device of the prior art.

In a variant embodiment, when an operating malfunction is detected by means of the sensors of the aviation system, the operating malfunction intervention means are selected by means of the filter module, corresponding to the operating malfunction which has occurred and/or the affected aircraft type, and activated by means of the switching device. This variant embodiment has the advantage that to eliminate the occurring operating malfunction by means of the filter module, the activated operating malfunction intervention means specifically select themselves, and can be adapted to the occurring operating malfunction and/or the location of the operating malfunction. For instance, the filter module for this variant embodiment can have appropriately implemented expert systems, neural network modules. In particular, the filtering and selection can be implemented using adapted lookup tables, for instance. This allows automation of the aviation systems on the basis of the system according to the invention, which was not nearly possible until now in the prior art.

In another variant embodiment, when an operating malfunction is detected by means of the sensors, the operating malfunction intervention means can be selected by means of the filter module, additionally on the basis of the activation stack memory level value, and are activated selectively by means of the switching device. This variant embodiment has the advantage, among others, that the aviation system can react dynamically to the transmitted activation parameters. Thus the memory threshold value and the accumulated activation parameters do not necessarily have to be identical. This allows, e.g. by means of the filter module, dynamic adaptation of the selected operating malfunction intervention devices, on the basis of the transmitted activation parameters.

In a further variant embodiment, the log parameters additionally include measured value parameters of the Flight Management System (FMS) and/or of the inertial navigation system (INS) and/or of the fly-by-wire sensors and/or flight monitoring devices of the aircraft, the memory threshold value being generated dynamically by means of the filter module for the relevant time window, on the basis of the Techlog stack memory level value and the additional log parameters. This variant embodiment has the advantage, among others, that for instance the aviation system can be adapted dynamically and in real time by means of the additional log parameters. Similarly, for instance, by means of the filter module the activation parameters and/or the memory threshold value can be adapted dynamically by means of the additional log parameters to the type and probabilities of an operating malfunction.

In yet another variant embodiment, the avionics of the aircraft include altimeter sensors and/or an air speed indicator and/or a variometer and/or a horizon gyro and/or a turn indicator and/or an accelerometer and/or stall warning sensors and/or external temperature sensors and/or a position finding device, the log parameters additionally including measured parameters of at least one of the sensors, and the memory threshold value being generated dynamically by means of the filter module for the relevant time window, on the basis of the Techlog stack memory level value and the additional log parameters. For instance, by means of a GPS module of the position finding module of the detection device, position-dependent parameters can be generated and transmitted to the earth station. This variant embodiment has the same advantages as the previous one, among others. In the case of the variant embodiment with a position finding module, at any time the operating malfunction intervention device can be monitored and controlled with respect to the position of the operating malfunction event, e.g. by means of the aviation system. Consequently, as mentioned, by means of the position capturing module of the detection device, for instance position co-ordinate parameters of the current position of the aircraft can be generated and transmitted to the earth station to trigger the intervention to eliminate an operating malfunction by means of the dedicatedly selected operating malfunction intervention devices. For instance, by means of at least one operating malfunction intervention device, when an intervention event is detected the operating malfunction of the aircraft is eliminated automatedly or at least semi-automatedly. This variant embodiment has the advantage, among others, that the operating malfunction intervention devices such as automated extinguishers, alarm devices for resources or intervention units, e.g. police or fire brigade intervention units, units for automatic locking, switching off or changing over, etc. can be automatedly optimised and/or activated in real time on the basis of the current position of the aircraft. The operating malfunction intervention device can contain, as well as automated devices for direct intervention, transmission modules based on money values. Since, by means of the position finding module of the detection device, for instance position co-ordinate parameters of the current position of the aircraft are generated and can be transmitted to the earth station, by means of the filter module, for instance, the activation parameters and/or the memory threshold value can be adapted dynamically to the probabilities of the occurrence of an operating malfunction. For instance, difficult land bases such as Hong Kong can be assigned to higher activation parameters or memory threshold values, whereas land bases with high safety such as Frankfurt or Zürich can be assigned to smaller values of the activation parameters and/or memory threshold value. The behaviour and environmental influences are thus fully and dynamically taken into account in the operation of the aircraft. This was not possible in the prior art until now. The same applies to captured measured parameters of the altimeter sensors, air speed indicator, variometer, horizon gyro, turn indicator, accelerometer, stall warning sensors or external temperature sensors of the aircraft.

In a variant embodiment, by means of the avionics of the aircraft or the communication means of the land base, ATIS measured parameters based on the Automatic Terminal Information Service (ATIS) of the land base being approached are transmitted automatically to the earth station for every landing and takeoff unit, the memory threshold value being determined dynamically for the relevant time window, on the basis of the Techlog stack memory level value, and adapted dynamically by means of the ATIS measured parameters. This variant embodiment has the same advantages as the previous one, among others. In particular, for instance, the aviation system can be adapted dynamically and in real time on the basis of the ATIS measured parameters. Similarly, for instance, by means of the filter module, the activation parameters and/or the memory threshold value can be adapted dynamically to the type and probabilities of an operating malfunction by means of the ATIS measured parameters.

In another variant embodiment, by means of the filter module of the earth station, dynamically determined first activation parameters are transmitted to the avionics of the aircraft and/or to a supplementary on-board system which is assigned to the relevant aircraft, and to increment the activation stack memory, protected second activation parameters are generated by the avionics or the assigned supplementary on-board system and transmitted to the earth station. The protected second activation parameters can include, for instance, a uniquely assignable identification number or other electronic identification (ID), e.g. an IMSI. This variant embodiment has the advantage, among others, that the second activation parameters and the first activation parameters do not have to be identical. For instance, this allows dynamic adaptation of the selected operating malfunction intervention devices on the basis of the second activation parameters, by means of the filter module. By protected addition of a uniquely assignable identification number, the activation parameters can, in particular, easily be transmitted via networks or processed by decentralised systems, for instance.

In a further variant embodiment, the earth station includes an interface for access to one or more databases with land-base-specific data records, each takeoff and/or landing unit which is detected by means of the detection device and recorded as a log parameter being assigned to at least one land-base-specific data record, and the log parameters being weighted by means of a weighting module on the basis of the assigned land-base-specific data record, and/or being generated in weighted form. The aviation system can additionally include, for instance, means for dynamic updating of the one or more databases with land-base-specific data records, it being possible to update the land-base-specific data records periodically and/or on request. The one or more databases can, for instance, be assigned in a decentralised manner to a land base for aircraft, data being transmitted to the earth station by means of an interface, unidirectionally and/or bidirectionally. This variant embodiment has the same advantages as the previous variant embodiment, among others. In particular, by accessing the databases with landing-unit-specific and/or takeoff-unit-specific data records, real time adaptation of the aviation system, e.g. concerning the technical conditions at the land bases being used, becomes possible. This makes it possible to keep the aviation system automatedly always up to date. This can be important, in particular, when taking account of new developments and introductions of technical systems to increase safety etc. in the cycles. The implementation of the databases also has the advantage that by means of the filter module or suitable decentralised filter means, data such as metadata of captured data can be generated and updated dynamically. This allows fast, easy access. In the case of a local database at the earth station, with periodic updating, for instance the aviation system can continue to function dynamically even if the connections to individual land bases are interrupted meanwhile.

In yet another variant embodiment, by means of an integrated oscillator of the filter module, an electrical clock signal with a reference frequency is generated, the filter module periodically, on the basis of the clock signal, determining the variable activation parameters and/or if appropriate transmitting them to the appropriate incremental stack. This variant embodiment has the advantage, among others, that the individual modules and units of the technical implementation of the aviation system can easily be synchronised and reconciled with each other.

At this point, it should be established that this invention refers, as well as to the aviation system according to the invention with an earth station, to a corresponding method.

Below, variant embodiments of this invention are described on the basis of examples. The examples of the embodiments are illustrated by the following attached figures:

FIG. 1 shows a block diagram, which represents schematically an embodiment of an avionic aviation system 80 according to the invention, with an earth station 81, for automatically eliminating operating malfunctions occurring in aircraft 40/41/42. The avionic aviation system 80 is connected to multiple aircraft 40/41/42 via a wireless interface 403 of the avionics 402. By means of a switching device 1 of the earth station 81, dedicated operating malfunction intervention devices 603 for automatic elimination of operating malfunctions are activated, if an operating malfunction occurs and is detected by means of sensors 3/401/601. On the basis of the log parameters, i.e. in particular of the measured cycles, a filter module 2 changes the control of the switching device 1.

Figure 2:
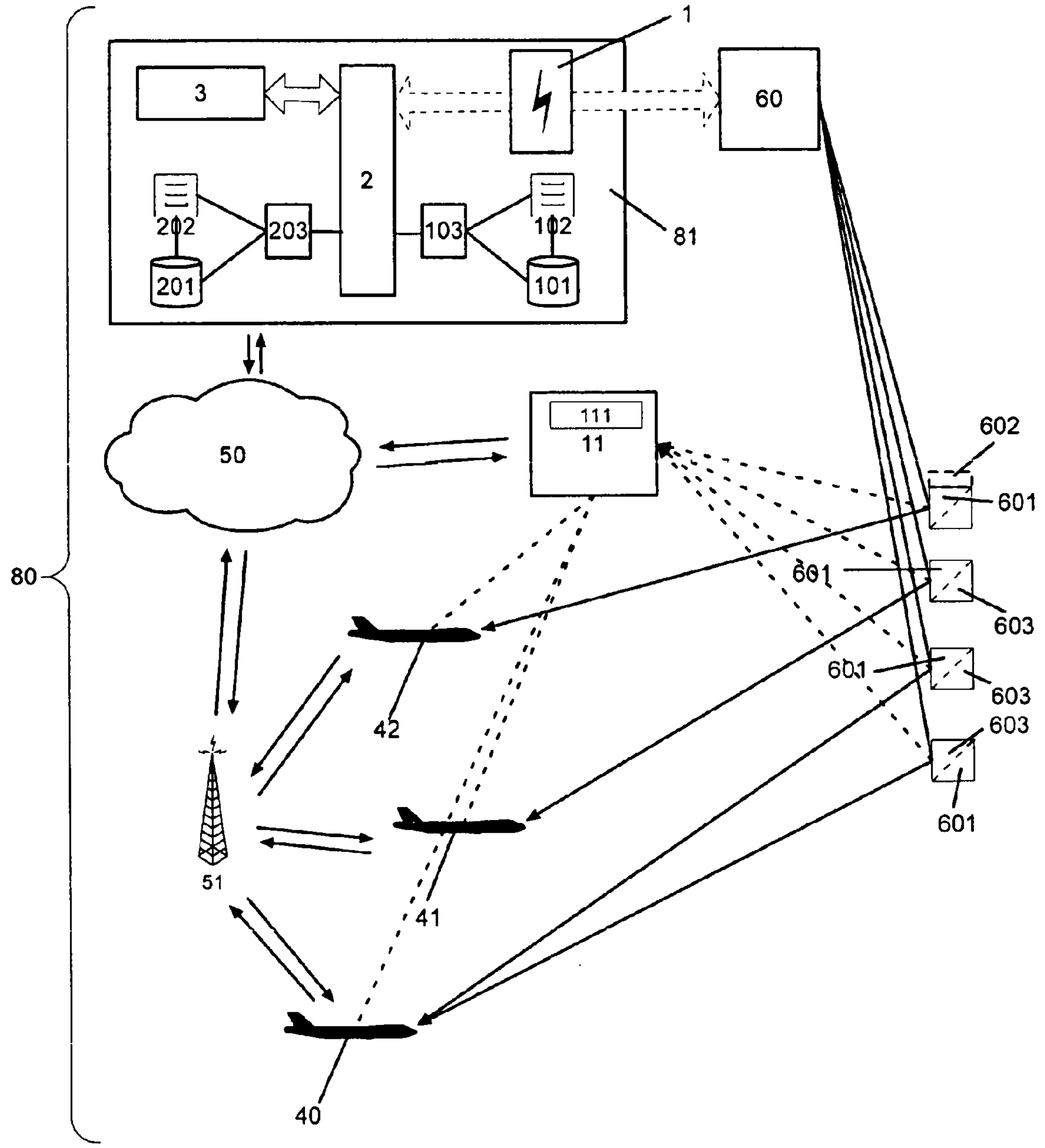

FIG. 2 also shows a block diagram, which represents schematically an embodiment of an avionic aviation system 80 according to the invention, with an earth station 81, for automatically eliminating operating malfunctions occurring in aircraft 40/41/42. The avionic aviation system 80 is connected to multiple aircraft 40/41/42 via a wireless interface 403 of the avionics 402. By means of a switching device 1 of the earth station 81, dedicated operating malfunction intervention devices 603 for automatic elimination of operating malfunctions are activated, if an operating malfunction occurs and is detected by means of sensors 3/401/601.

FIGS. 1 and 2 illustrate an architecture which can be used to implement the invention. In this embodiment, the avionic aviation system 80 with earth station 81 is connected to multiple aircraft 40/41/42 via a wireless interface 403 of the avionics 402 of the aircraft 40/41/42, for automatically eliminating operating malfunctions occurring in aircraft 40/41/42. The aviation system 80 with earth station 81 can, for instance, be part of a technical system of an aircraft 40, . . . , 42 operator, such as an air carrier or air freight transport company, but also of an aircraft manufacturer such as Airbus or Boeing, or flight monitoring services. The aircraft can include, for instance, aircraft for freight transport 40/41 and/or passenger transport 42 and/or airships such as Zeppelins, or even shuttles or other means of flight for space travel. The aircraft 40, . . . , 42 can also include motorised and non-motorised means of flight, in particular gliders, motor gliders, delta wing gliders and similar. For a specific operating malfunction event, dedicated operating malfunction intervention devices 603 are activated to eliminate the operating malfunction automatically by means of a switching device 1 of the earth station 81, if an operating malfunction occurs and is detected by means of sensors 3/401/601. In particular, the earth station 81 and/or the operating malfunction intervention devices 603 can include emergency and alarm devices, e.g. partly automated, with transmission modules based on money values. The sensors 3/401/601 can, for instance, be at least partly integrated into the avionics 402 of the aircraft 40, . . . , 42, the controller of the operating malfunction elimination devices 603, and/or into the earth station 81 and/or land base 11, to detect an operating malfunction. The operating malfunction intervention devices 603 can be, for instance, monitoring devices, alarm devices or systems for direct technical intervention in the affected aircraft 40, . . . , 42, the operator of the aircraft 40, . . . , 42 and/or land base 11 and/or earth station 81 which is affected when corresponding operating malfunctions are detected. Of course, multiple aircraft 40, . . . , 42, earth stations 81 and/or land bases 11 can be affected simultaneously or captured by means of the aviation system. The operating malfunction can, for instance, be eliminated by linked and/or graduated technical interventions, e.g. triggering different monitoring services or throttle and apportionment filters in the case of corresponding apportionment devices or valves, etc. Operating malfunction elimination devices 603 which, for instance, are activated by the aviation system 80, are also possible, e.g. in the sense of automated or partly automated emergency interventions (or triggering of them) by medically trained personnel, or automated triggering of emergency situations which are conditioned by flight such as patient transport etc., the alarm for which is raised by signal data which is generated by means of the aviation system 80 and selectively transmitted. Operating malfunction elimination devices 603 can, for instance, be connected by an interface unidirectionally or bidirectionally to the aircraft 40, . . . , 42 and/or the earth station 81 and/or the land base 11, to control the devices 603 by means of the aviation system 80 for automated elimination in the case of operating malfunctions. Reference number 60 describes the intervention device as a whole, including the communication interface 601, possibly with sensors to measure operating malfunctions, the controller 602 for electronic monitoring and control of the operating malfunction intervention device 603, and the operating malfunction intervention device 603.

By means of the sensors 3/401/601, an occurring operating malfunction is detected, and by means of the filter module 2 the operating malfunction intervention means 603 are, for instance, selected corresponding to the operating malfunction which has occurred, and/or the affected aircraft type 40, . . . , 42, and activated by means of the switching device 1. The aviation system 80 includes detection devices 411 which are integrated into the avionics 402 of the aircraft 40/41/42. By means of the detection devices 411, takeoff and/or landing units which an aircraft 40/41/42 has carried out are captured electronically, corresponding log parameters, assigned to the aircraft 40, . . . , 42, of the carried-out takeoff and/or landing units being transmitted from the detection devices 411 via the wireless interface 403 to the earth station 81. The log parameters can at least partly be captured in the form of amount value parameters, for instance. By means of the wireless interface 403 of the avionics 402 of the aircraft 40, . . . , 42, for instance the assigned log parameters can be transmitted via a satellite-supported network 70 directly to the earth station 81. The assigned log parameters can also, for instance, be transmitted to the earth station 81 via a wireless communication network 111 of a land base 11 which is being approached. The earth station 81 contains, for every aircraft 40, . . . , 42, an incrementable Techlog stack memory 202 with a readable stack memory level value. The Techlog stack memory level value is raised by means of a counter module 203 of the earth station 81 on the basis of filtered takeoff and/or landing units of the transmitted log parameters of the relevant aircraft 40, . . . , 42. The counter module 203 also contains means of reading the Techlog stack memory level value. By means of a filter module 2 of the earth station 81, for a specified time window, a memory threshold value to enable the activation of the operating malfunction intervention device 603 is determined dynamically on the basis of the Techlog stack memory level value. The earth station 81 contains an activation stack memory 102 of a protected memory module 103, by means of which activation parameters of the aircraft 40, . . . , 42 are captured. The activation parameters are transmitted to the earth station 81 on the basis of the current memory threshold value, and the activation stack memory 102 is incremented in steps corresponding to the transmitted activation parameters. As a special case, the activation parameters can include amount values which are at least partly monetary and/or based on money values, in particular electronically protected parameters. As a variant embodiment, for instance, by means of the filter module 2 of the earth station 81, first activation parameters can be determined dynamically and transmitted to the avionics (402) of the aircraft 40, . . . , 42 and/or to a supplementary off-board system 404 which is assigned to the appropriate aircraft 40, . . . , 42. To increment the activation stack memory, for instance protected second activation parameters are generated by the avionics 402 or the assigned supplementary off-board system 404 and transmitted to the earth station 81. The protected second activation parameters can include, for instance, a uniquely assignable identification number. By means of a further counter module 103 of the earth station 81, the activation stack memory level value of the activation stack memory 102 is cumulatively captured. The capture can take place periodically and/or on request and/or on transmission. If the dynamically determined memory threshold value is reached with the activation stack memory level value, by means of the filter module 2 the switching device 1 is released for dedicated activation of operating malfunction intervention means 603 if operating malfunctions occur.

The variable activation parameter or memory threshold value is determined, e.g. periodically, by means of the filter module 2, on the basis of the detected number of takeoff and/or landing units or of the log parameters, and with reverse transmission can be transmitted to the earth station 81 onto the activation stack memory 102. The filter module 2 and/or the counter modules 103/203 can include an integrated oscillator, by means of which oscillator an electrical clock signal with a reference frequency can be generated, it being possible to activate the filter module 2 and/or the counter modules 103/203 periodically on the basis of the clock signal. The variable activation parameter and/or activation stack memory can, for instance, be determined dynamically or partly dynamically by means of the filter module 2, on the basis of the detected number of takeoff and/or landing units. As a variant embodiment, for instance when an operating malfunction is detected by means of the sensors 3/401/601, the operating malfunction intervention devices 603 are additionally selected by means of the filter module 2 and on the basis of the activation stack memory level value, and activated by means of the switching device 1. Similarly, the log parameters can additionally include, for instance, measured value parameters of the Flight Management System (FMS) and/or of the inertial navigation system (INS) and/or of the fly-by-wire sensors and/or flight monitoring devices of the aircraft 40, . . . , 42, the memory threshold value being generated dynamically by means of the filter module 2 for the relevant time window, on the basis of the Techlog stack memory level value and the additional log parameters. The avionics 402 of the aircraft 40, . . . , 42 can also include, for instance, altimeter sensors and/or an air speed indicator and/or a variometer and/or a horizon gyro and/or a turn indicator and/or an accelerometer and/or stall warning sensors and/or external temperature sensors and/or a position finding device. The position finding module of the detection device 411 can include, for instance, at least one GPS module to generate position-dependent parameters which can be transmitted. In the stated cases, the log parameters also include measured parameters of at least one of the sensors, the memory threshold value being generated dynamically by means of the filter module 2 for the relevant time window, on the basis of the Techlog stack memory level value and the additional log parameters. Also, by means of the avionics 402 of the aircraft 40, . . . , 42 or the communication means 111 of the land base 11, for instance ATIS measured parameters based on the Automatic Terminal Information Service (ATIS) of the land base 11 being approached are transmitted automatically to the earth station 81 for every landing and takeoff unit (cycle), the memory threshold value being generated dynamically for the relevant time window, on the basis of the Techlog stack memory level value and the transmitted ATIS measured parameters. As mentioned, the detection device 411 includes measurement sensors for dynamic or partly dynamic detection of takeoff and/or landing units. For this purpose, the detection device 411, as described for the avionics 403, can include, for instance, altimeter sensors and/or an air speed indicator and/or a variometer and/or a horizon gyro and/or a turn indicator and/or an accelerometer and/or stall warning sensors and/or external temperature sensors and/or a position finding device. The detection device 411 can also include, for instance, sensors and/or detection means for dynamic detection of land-base-specific data of the assigned landing/takeoff base for flight transport means 40/41 and/or passenger flight transport means 42. The assigned flight transport means 40/41 and/or passenger flight transport means 42 can include, for instance, the detection device 411, with an interface to the filter module 2 and/or to the user device 11. The stated interface from the detection device 411 to the filter module 2 and/or to the user device 11 can include, for instance, an air interface. In particular, the detection device 411 can include, for instance, a position finding module to generate position-dependent parameters which can be transmitted. The position finding module of the detection device 411 can include, for instance, at least one GPS module to generate position-dependent parameters which can be transmitted.

In a variant embodiment, the earth station 81 can include, for instance, an interface for access to one or more databases with land-base-specific data records. Each takeoff and/or landing unit (cycle) which is detected by means of the detection device 411 and recorded as a log parameter is assigned to at least one land-base-specific data record, the log parameters being weighted by means of a weighting module on the basis of the assigned land-base-specific data record. The aviation system 80 can additionally include, for instance, means for dynamic updating of the one or more databases with land-base-specific data records. The land-base-specific data records can be updated periodically and/or on request, for instance. The one or more databases can, for instance, be assigned in a decentralised manner to a land base 11 for aircraft 40, . . . , 42. Data can be transmitted from the land base 11 to the earth station 81 by means of an interface 111, unidirectionally and/or bidirectionally, for instance. It is of course also possible that the landing-unit-specific or takeoff-unit-specific data records and/or data are captured by means of access to databases of state and/or partly state and/or private control stations and/or other databases of takeoff and landing bases. The captured data can, for instance, be assigned and stored in a data memory, and can for instance be updated periodically and/or on request. By this variant embodiment, for instance different country-specific conditions can be taken into account, e.g. technical and maintenance differences, e.g. between an airport such as Frankfurt, Hong Kong (difficult landing situation), or an airport in a developing country such as Angola or Uzbekistan (bad technical equipment). This has the advantage that changes in the takeoff and/or landing conditions are captured directly, for instance, by technical changes in the bases, and thus the aviation system is always up to date. In particular, in this way the system is automated to an extent which has never been achieved in another way in the prior art. The aviation system 80 can, for instance, also include and be assigned to the stated one or more databases. In this case, for instance, by means of suitable filter means, data such as metadata of captured data can be generated and updated dynamically. This allows fast, easy access. The automated alarm and intervention system can also continue to function even if the connections to user equipment and/or capture units are interrupted. As mentioned, the data can, in particular, include metadata, which for instance are extracted on the basis of a content-based indexing technique. As an exemplary embodiment, the metadata can be generated at least partly dynamically (in real time) on the basis of the log parameters which are transmitted by means of the detection devices 411. This has the advantage, for instance, that the metadata always have meaningful up-to-dateness and precision for the system according to the invention. In a special exemplary embodiment, the operating malfunction intervention devices 603 can additionally include intervention means based on money values, for monetary cover of the elimination of operating malfunctions in the aircraft 40, . . . , 42. For the special case of these operating malfunction intervention devices 603, the activation parameters, i.e. the cases in which at least one of the operating malfunction intervention devices 603 should be activated, are often regulated by country-specific laws, and include private systems and/or state systems and/or partly state systems. As mentioned, the avionic aviation system 80 can include, assigned to it, multiple land bases 11 or/or earth stations 81 with aircraft 40, . . . , 42. The aircraft 40, . . . , 42 and/or the land base 11 can be connected unidirectionally and/or bidirectionally to the earth station 81 via the communication network 50/51 and/or the satellite-based network 70. The communication network 50/51 and/or the satellite-based network 70 can include, for instance, a GSM or UMTS network, or a satellite-based mobile communication network, and/or one or more fixed networks, e.g. the public switched telephone network, the world-wide Internet or a suitable LAN (Local Area Network) or WAN (Wide Area Network). In particular, it also includes ISDN and XDSL connections. In the case of a unidirectional connection, the communication network 50/51/70 can also include broadcast systems (e.g. Digital Audio Broadcasting DAB or Digital Video Broadcasting), with which broadcast transmitters distribute digital audio or video programmes (television programmes) and digital data, e.g. data for execution of data services, programme associated data (PAD), unidirectionally to broadcast receivers. This can be useful, depending on the variant embodiment. However, the unidirectional distribution property of these broadcast systems can have the disadvantage, among others, that particularly in the case of transmission by radio waves, a reverse channel from the broadcast receivers to the broadcast transmitters or their operators is absent. Because of this absent reverse channel, the possibilities for encryption, data security, charging etc. of access-controlled programmes and/or data are more restricted.

Reference list

| | |
|---|---|
| 1 | switching device |
| 2 | filter module |
| 3 | sensors with gateway interface |
| 11 | land base |
| 111 | communication means |
| 40, . . . ,42 | aircraft |
| 401 | sensors |
| 402 | avionics |
| 403 | wireless communication means |
| 404 | supplementary off-board system |
| 411 | detection device for takeoff and/or landing units |
| 50/51 | communication network |
| 60 | intervention device |
| 601 | sensors/interface |
| 602 | controller |
| 603 | operating malfunction intervention device |
| 70 | satellite-supported network |
| 80 | avionic aviation system |
| 81 | earth station |
| 101 | protected first memory module |
| 102 | activation stack memory |
| 103 | counter module |
| 201 | protected second memory module |
| 202 | Techlog stack memory |
| 203 | counter module |

The invention claimed is:

1. An avionic aviation system with an earth station for automatically eliminating operating malfunctions occurring in aircraft, the avionic aviation system being connected to multiple aircraft via a wireless interface of aircraft avionics, and it being possible to activate dedicated operating malfunction intervention devices for automatic elimination of operating malfunctions by a switching device of the earth station if an operating malfunction occurs and is detected by sensors, comprising:

detection devices which are integrated into the avionics of the aircraft for electronic capture of executed takeoff and/or landing units of an aircraft, log parameters, which are assigned to an aircraft, of the executed takeoff and/or landing units being transmitted by the detection devices via the wireless interface to the earth station, wherein the earth station includes an interface for access to one or more databases with land-base-specific data records each takeoff and/or landing unit which is detected by the detection device and recorded as a log parameter being assigned to at least one land-base-specific data record, and the log parameters being weighed by a weighting module on the basis of the assigned land-base-specific data record, the earth station includes, for every aircraft, an incrementable first stack memory with a readable stack memory level value, the stack memory level value of the first stack memory being incrementable by a counter module on the basis of filtered takeoff and/or landing units of the transmitted log parameters of a relevant aircraft, the counter module reads the stack memory level value of the first stack memory, and the earth station includes a filter module, by which filter module, for a specified time window, a memory threshold value to enable the activation of the operating malfunction intervention device is determined dynamically on the basis of the stack memory level value of the first stack memory, the earth station includes a second stack memory of a protected memory module to capture activation parameters of the aircraft the activation parameters being transmitted to the earth station on the basis of the current memory threshold value, and the second stack memory being incrementable in steps corresponding to the transmitted activation parameters, and by a counter module of the earth station a stack memory level value of the second stack memory is cumulatively captured, and when the dynamically determined memory threshold value is reached with the stack memory level value of the second stack memory, by the filter module the switching device is released for dedicated activation of the operating malfunction intervention devices when operating malfunctions occur.

2. The avionic aviation system with an earth station according to claim 1, wherein when an operating malfunction is detected by the sensors, the operating malfunction intervention devices are selected by the filter module, corresponding to the operating malfunction which has occurred and/or the affected aircraft type, and activated by the switching device.

3. The avionic aviation system with an earth station according to claim 2, wherein when an operating malfunction is detected by the sensors, the operating malfunction intervention devices are selected by the filter module, additionally on the basis of the second stack memory level value, and activated by the switching device.

4. The avionic aviation system with an earth station according to claim 1, wherein the log parameters additionally include measured value parameters of a Flight Management System and/or of inertial navigation system and/or of fly-by-wire sensors and/or flight monitoring devices of the aircraft, the memory threshold value being generated dynamically by the filter module for the relevant time window, on the basis of the first stack memory level value and the additional log parameters.

5. The avionic aviation system with an earth station according to claim 4, wherein the avionics of the aircraft include altimeter sensors and/or an air speed indicator and/or a variometer and/or a horizon gyro and/or a turn indicator and/or an accelerometer and/or stall warning sensors and/or external temperature sensors and/or a position finding device, the log parameters additionally including measured parameters of at least one of the sensors, and the memory threshold value being generated dynamically by the filter module for the relevant time window, on the basis of the first stack memory level value and the additional log parameters.

6. The avionic aviation system with an earth station according to claim 1, wherein by the avionics of the aircraft or a communication unit of a land base, ATIS measured parameters based on an Automatic Terminal Information Service (ATIS) of the land base being approached are transmitted automatically to the earth station for every landing and takeoff unit, the memory threshold value being generated dynamically for the relevant time window, on the basis of the first stack memory level value and the transmitted ATIS measured parameters.

7. The avionic aviation system with an earth station according to claim 1, wherein by the filter module of the earth station, dynamically determined first activation parameters are transmitted to the avionics of the aircraft and/or to a supplementary on-board system which is assigned to the relevant aircraft, and to increment the second stack memory, protected second activation parameters are generated by the avionics or the assigned supplementary on-board system and transmitted to the earth station.

8. The avionic aviation system with an earth station according to claim 7, wherein the protected second activation parameters include a uniquely assignable identification number.

9. The avionic aviation system with an earth station according to claim 1, wherein the assigned log parameters are transmitted directly to the earth station via a satellite-based network by the wireless interface of the avionics of the aircraft.

10. The avionic aviation system with an earth station according to claim 1, wherein the assigned log parameters are transmitted to the earth station by the wireless interface of the avionics of the aircraft, via a wireless communication network of a land base which is being approached.

11. The avionic aviation system with an earth station according to claim 1, wherein the aviation system dynamically updates the one or more databases with land-base-specific data records, the land-base-specific data records being updated periodically and/or on request.

12. The avionic aviation system with an earth station according to claim 1, wherein the one or more databases are assigned in a decentralized manner to a land base for aircraft data from the land base being transmitted to the earth station by an interface, unidirectionally and/or bidirectionally.

13. An avionic aviation system with an earth station for automatically eliminating operating malfunctions occurring in aircraft, the avionic aviation system being connected to multiple aircraft via a wireless interface of aircraft avionics, and dedicated operating malfunction intervention devices for automatic elimination of operating malfunctions being activated by a switching device of the earth station if an operating malfunction occurs and is detected by sensors, comprising:

integrated detection devices of the avionics of an aircraft that electronically capture executed takeoff and/or landing units of the aircraft, log parameters, which are assigned to the aircraft, of the executed takeoff and/or landing units being transmitted by the detection devices via the wireless interface to the earth station, a counter module of the earth station that increments a first stack memory level value of an incrementable first stack memory on the basis of filtered takeoff and/or landing units of the transmitted log parameters of the relevant aircraft, a counter module that reads the first stack memory level value, and by a filter module of the earth station, for a specified time window, a memory threshold value to enable the activation of the operating malfunction intervention device is determined dynamically on the basis of the first stack memory level value, a second stack memory of a protected memory module of the earth station that captures activation parameters of the aircraft, which are transmitted to the earth station, the activation parameters being transmitted to the earth station on the basis of the current memory threshold value, and the second stack memory being incremented in steps corresponding to the transmitted activation parameters, and a counter module of the earth station that cumulatively captures a stack memory level value of the second stack memory, and when the dynamically determined memory threshold value is reached with the stack memory level value of the second stack memory, by the filter module the switching device is released for dedicated activation of the operating malfunction intervention devices when operating malfunctions occur.

14. The avionic aviation system with an earth station according to claim 13, wherein when an operating malfunction is detected by the sensors, the operating malfunction intervention devices are selected by the filter module, corresponding to the operating malfunction which has occurred and/or the affected aircraft type, and activated by the switching device.

15. The avionic aviation system with an earth station according to claim 14, wherein when an operating malfunction is detected by the sensors, the operating malfunction intervention devices are selected by the filter module, additionally on the basis of the activation stack memory level value, and activated by the switching device.

16. The avionic aviation system with an earth station according to claim 13, wherein the log parameters additionally include measured value parameters of a Flight Management System (FMS) and/or of inertial navigation system (INS) and/or of fly-by-wire sensors and/or flight monitoring devices, the memory threshold value being generated dynamically by the filter module for the relevant time window, on the basis of the first stack memory level value and the additional log parameters.

17. The avionic aviation system with an earth station according to claim 16, wherein by the avionics of the aircraft include altimeter sensors and/or an air speed indicator and/or a variometer and/or a horizon gyro and/or a turn indicator and/or an accelerometer and/or stall warning sensors and/or external temperature sensors and/or a position finding device, the log parameters additionally including measured parameters of at least one of the sensors, and the memory threshold value being generated dynamically and correspondingly by the filter module for the relevant time window, on the basis of the first stack memory level value and the additional log parameters.

18. The avionic aviation system with an earth station according to claim 13, wherein by the avionics of the aircraft or the communication unit of a land base, ATIS measured parameters based on an Automatic Terminal Information Service (ATIS) of the land base being approached are transmitted automatically to the earth station for every landing and take-off unit, the memory threshold value being generated dynamically by the filter module for the relevant time window, on the basis of the first stack memory level value and the transmitted ATIS measured parameters.

19. The avionic aviation system with an earth station according to claim 13, wherein by the filter module of the earth station, dynamically determined first activation parameters are transmitted to the avionics of the aircraft and/or to a supplementary on-board system which is assigned to the relevant aircraft, and to increment the activation stack memory, protected second activation parameters are generated by the avionics or the assigned supplementary on-board system and transmitted to the earth station.

20. The avionic aviation system with an earth station according to claim 19, wherein the protected second activation parameters include a uniquely assignable identification number.

21. The avionic aviation system with an earth station according to claim 13, wherein the assigned log parameters are transmitted directly to the earth station via a satellite-based network by the wireless interface of the avionics of the aircraft.

22. The avionic aviation system with an earth station according to claim 13, wherein the assigned log parameters are transmitted to the earth station by the wireless interface of the avionics of the aircraft, via a wireless communication network of a land base which is being approached.

23. The avionic aviation system with an earth station according to claim 22, wherein the aviation system the one or more databases with land-base-specific data records are updated dynamically, the land-base-specific data records being updated periodically and/or on request.

24. The avionic aviation system with an earth station according to claim 17, wherein the one or more databases are assigned in a decentralized manner to a land base for aircraft, data being transmitted from the land base to the earth station by an interface of the land base, unidirectionally and/or bidirectionally.

* * * * *